US012310444B2

(12) United States Patent
Lombard

(10) Patent No.: US 12,310,444 B2
(45) **Date of Patent: *May 27, 2025**

(54) HELMET LIGHTING SYSTEM

(71) Applicant: Vernon Lombard, New Orleans, LA (US)

(72) Inventor: Vernon Lombard, New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,411

(22) Filed: Aug. 1, 2023

(65) Prior Publication Data

US 2024/0099410 A1 Mar. 28, 2024

Related U.S. Application Data

(63) Continuation of application No. 17/706,450, filed on Mar. 28, 2022, now Pat. No. 11,717,045, which is a (Continued)

(51) Int. Cl.
*A42B 3/04* (2006.01)
*F21V 21/084* (2006.01)
(Continued)

(52) U.S. Cl.
CPC ............ *A42B 3/0453* (2013.01); *A42B 3/044* (2013.01); *F21V 21/084* (2013.01); (Continued)

(58) Field of Classification Search
None
See application file for complete search history.

(56) References Cited

U.S. PATENT DOCUMENTS 4,196,429 A 4/1980 Davis
4,231,079 A 10/1980 Heminover
(Continued)

FOREIGN PATENT DOCUMENTS

CN 2807837 Y * 8/2006

OTHER PUBLICATIONS

Cai, Cheng-Yang, "Description CN2807837Y", Aug. 23, 2006, Patent Translate by EPO, pp. 1-8. (Year: 2006).*
(Continued)

*Primary Examiner* — Christopher E Dunay
(74) *Attorney, Agent, or Firm* — VIA LLP

(57) ABSTRACT

A helmet including a lighting system integrated into said helmet, the lighting system comprising a first layer; light emitting means mounted to said first layer; controller means mounted to said first layer for controlling said light emitting means; wiring means for linking said light emitting means to said controller means; a second layer fixably attached to said first layer thereby providing an area between said first and second layer for said light emitting means, controller means, and wiring means; power means fixably attached to said second layer for powering said controller and light emitting means; and operating means functionally linked to said controller means for operating said controller means. The application also discloses lighting system contained in a shell that can be attached to an existing helmet. This application also discloses a lighting system contained in a flexible material that can be fitted onto an existing helmet.

20 Claims, 10 Drawing Sheets

Related U.S. Application Data continuation of application No. 17/023,093, filed on Sep. 16, 2020, now Pat. No. 11,291,261, which is a continuation of application No. 16/054,168, filed on Aug. 3, 2018, now Pat. No. 10,786,029, which is a continuation of application No. 15/207,757, filed on Jul. 12, 2016, now Pat. No. 10,039,336, which is a continuation of application No. 14/106,561, filed on Dec. 13, 2013, now Pat. No. 9,392,832, which is a continuation of application No. 13/486,324, filed on Jun. 1, 2012, now Pat. No. 8,608,333, which is a continuation of application No. 12/955,719, filed on Nov. 29, 2010, now Pat. No. 8,192,043, which is a continuation-in-part of application No. 11/687,177, filed on Mar. 16, 2007, now Pat. No. 7,845,816, which is a continuation-in-part of application No. 11/538,136, filed on Oct. 3, 2006, now abandoned.

(51) Int. Cl.

*F21V 23/00* (2015.01)
*F21V 23/04* (2006.01)
*F21V 23/02* (2006.01)
*F21Y 115/10* (2016.01)

(52) U.S. Cl.

CPC ........ *F21V 23/006* (2013.01); *F21V 23/0435* (2013.01); *F21V 23/0492* (2013.01); *F21V 23/023* (2013.01); *F21V 23/04* (2013.01); *F21Y 2115/10* (2016.08)

(56) References Cited

U.S. PATENT DOCUMENTS

| | | | |
|---|---|---|---|
| 4,559,516 | A | 12/1985 | Schott |
| 4,559,586 | A | 12/1985 | Slarve |
| 4,891,736 | A | 1/1990 | Gouda |
| 4,956,752 | A | 9/1990 | Foglietti |
| 5,040,099 | A | 8/1991 | Harris |
| 5,327,587 | A | 7/1994 | Hurwitz |
| 5,353,008 | A | 10/1994 | Eikenberry et al. |
| 5,357,409 | A | 10/1994 | Glatt |
| 5,416,675 | A | 5/1995 | DeBeaux |
| 5,426,792 | A | 6/1995 | Murasko |
| 5,477,209 | A | 12/1995 | Benson, Jr. et al. |
| 5,479,325 | A | 12/1995 | Chien |
| 5,485,358 | A | 1/1996 | Chien |
| 5,564,128 | A | 10/1996 | Richardson |
| 5,570,946 | A | 11/1996 | Chien |
| 5,688,039 | A | 11/1997 | Johnson |
| 5,758,947 | A | 6/1998 | Glatt |
| 5,810,467 | A | 9/1998 | Hurwitz |
| 5,871,271 | A | 2/1999 | Chien |
| 5,910,764 | A | 6/1999 | Hayden |
| 5,931,559 | A | 8/1999 | Pfaeffle |
| 6,007,213 | A | 12/1999 | Baumgartner |
| 6,101,636 | A | 8/2000 | Williams |
| 6,159,324 | A | 12/2000 | Watters et al. |
| 6,244,721 | B1 | 6/2001 | Rodriquez et al. |
| 6,325,521 | B1 | 12/2001 | Gregg et al. |
| 6,328,454 | B1 | 12/2001 | Davis |
| 6,348,859 | B1 | 2/2002 | Baker |
| 6,406,168 | B1 | 6/2002 | Whiting |
| 6,499,145 | B1 | 12/2002 | Kates |
| 6,529,126 | B1 | 3/2003 | Henry |
| 6,529,128 | B2 | 3/2003 | Henry |
| 6,532,602 | B2 | 3/2003 | Watters et al. |
| 6,686,837 | B2 | 2/2004 | Kim |
| 6,720,870 | B2 | 4/2004 | Morse |
| 6,752,510 | B1 | 6/2004 | Appiah |
| 6,784,795 | B1 | 8/2004 | Pories et al. |
| 6,933,839 | B2 | 8/2005 | Henry |
| 6,935,761 | B2 | 8/2005 | Vanderschuit |
| 7,111,956 | B2 | 9/2006 | Brown |
| 7,121,076 | B2 | 10/2006 | Priegelmeir et al. |
| 7,121,676 | B1 | 10/2006 | Kutnyak |
| 7,128,434 | B1 | 10/2006 | Nally et al. |
| 7,311,413 | B1 | 12/2007 | Barnes |
| 7,425,082 | B1 | 9/2008 | Jones |
| 7,841,026 | B2 | 11/2010 | Makris |
| 7,845,816 | B2 | 12/2010 | Lombard |
| 8,192,043 | B2 | 6/2012 | Lombard |
| 8,608,333 | B2 | 12/2013 | Lombard |
| 10,039,336 | B2 | 8/2018 | Lombard |
| 11,291,261 | B2 | 4/2022 | Lombard |
| 11,717,045 | B2 * | 8/2023 | Lombard ............... A42B 3/044 362/106 |
| 2003/0137413 | A1 | 7/2003 | Morse |
| 2003/0231109 | A1 | 12/2003 | Kim |
| 2004/0008106 | A1 | 1/2004 | Konczai |
| 2004/0227628 | A1 | 11/2004 | Burdick |
| 2004/0264173 | A1 | 12/2004 | Vanderschuit |
| 2005/0134439 | A1 | 6/2005 | Moore et al. |
| 2005/0162265 | A1 | 7/2005 | Werner et al. |
| 2008/0080171 | A1 | 4/2008 | Lombard |
| 2016/0360817 | A1 | 12/2016 | Lombard |

OTHER PUBLICATIONS

International Search Report; Application No. PCT/US2011/062243; Nov. 28, 2011.
International Search Report; Application No. PCT/US2011/062243; Jul. 10, 2012 in 8 pages.

* cited by examiner 10
19
18
13
12
11
21
22
23
16
3

HELMET LIGHTING SYSTEM

INCORPORATION BY REFERENCE TO RELATED APPLICATIONS

Any and all priority applications identified in the Application Data Sheet, or any correction thereto, are hereby incorporated by reference herein and made a part of the present disclosure.

BACKGROUND OF THE INVENTION

This application relates generally to a helmet lighting system. More specifically, this application discloses a lighting system that can be integrated into a helmet and a lighting system for attachment to an existing helmet.

SUMMARY OF THE INVENTION

This application discloses an integrated helmet lighting system for providing a helmet with a light source. The system is of simple construction and can be used in a variety of applications including helmets used by law enforcement, the military, the coast guard, firemen, civilian motorcycle riders, bicycle riders and any other individual that would benefit from the use of wearing a helmet that includes a light source. Such benefits include, but are not limited to, enhancing the wearer's visibility, signaling, and the simple enjoyment of using a light source integrated to a helmet to convey a personal design or message.

In particular, this application discloses a helmet including a lighting system integrated into said helmet, the lighting system comprising a first layer; light emitting means mounted to said first layer; controller means mounted to said first layer for controlling said light emitting means; wiring means for linking said light emitting means to said controller means; a second layer fixably attached to said first layer thereby providing an area between said first and second layer for said light emitting means, controller means, and wiring means; power means fixably attached to said second layer for powering said controller and light emitting means; and operating means functionally linked to said controller means for operating said controller means.

This application also discloses a helmet lighting system for attachment to an existing helmet, the system comprising a first layer; light emitting means mounted to said first layer; controller means mounted to said first layer for controlling said light emitting means; wiring means for linking said light emitting means to said controller means; a second layer fixably attached to said first layer thereby providing an area between said first and second layer for said light emitting means, controller means, and wiring means; power means fixably attached to said second layer for powering said controller and light emitting means; operating means functionally linked to said controller means for operating said controller means; and attachment means for attachment of said lighting system to the exterior surface of said existing helmet.

This application further discloses a helmet including a lighting system integrated into said helmet, the lighting system comprising a first layer; light emitting diodes mounted to said first layer; a circuit board mounted to said first layer for controlling said light emitting diodes; wires for linking said light emitting diodes to said circuit board; a second layer fixably attached to said first layer thereby providing an area between said first and second layer for said light emitting diodes, circuit board, and wires; power means fixably attached to said second layer for powering said circuit board and light emitting diodes; and operating means functionally linked to said circuit board for operating said controller means.

This application also discloses a flexible helmet lighting system composed of latex or other similar material that can be fitted over an existing helmet, the system comprising a first layer; light emitting means mounted to said first layer; controller means mounted to said first layer for controlling said light emitting means; wiring means for linking said light emitting means to said controller means; a second layer fixably attached to said first layer thereby providing an area between said first and second layer for said light emitting means, controller means, and wiring means; power means fixably attached to said second layer for powering said controller and light emitting means; operating means functionally linked to said controller means for operating said controller means; and fitted means for fitting of said flexible lighting system to the exterior surface of said existing helmet.

BRIEF DESCRIPTION OF THE DRAWINGS

The drawings, when considered in connection with the following description, are presented for the purpose of facilitating an understanding of the subject matter sought to be protected.

DETAILED DESCRIPTION OF THE PREFERRED EMBODIMENTS

Figure 9:
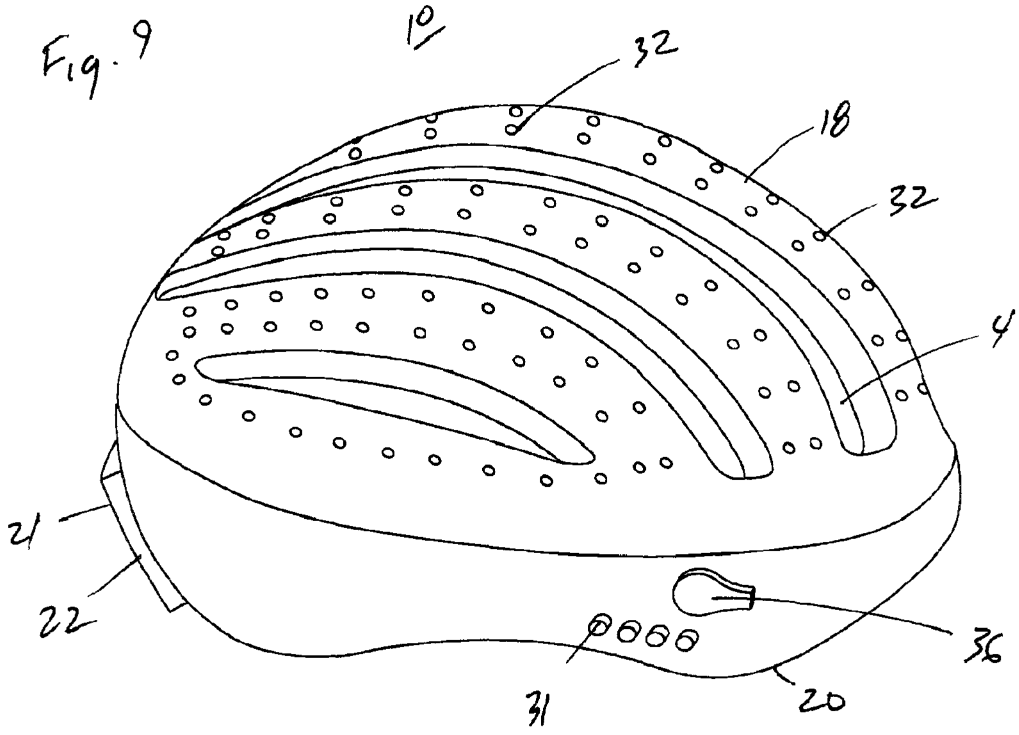
FIG. 9 is a perspective view of the first embodiment of the helmet lighting system disclosed herein incorporated into a bicycle helmet.
Figure 10:
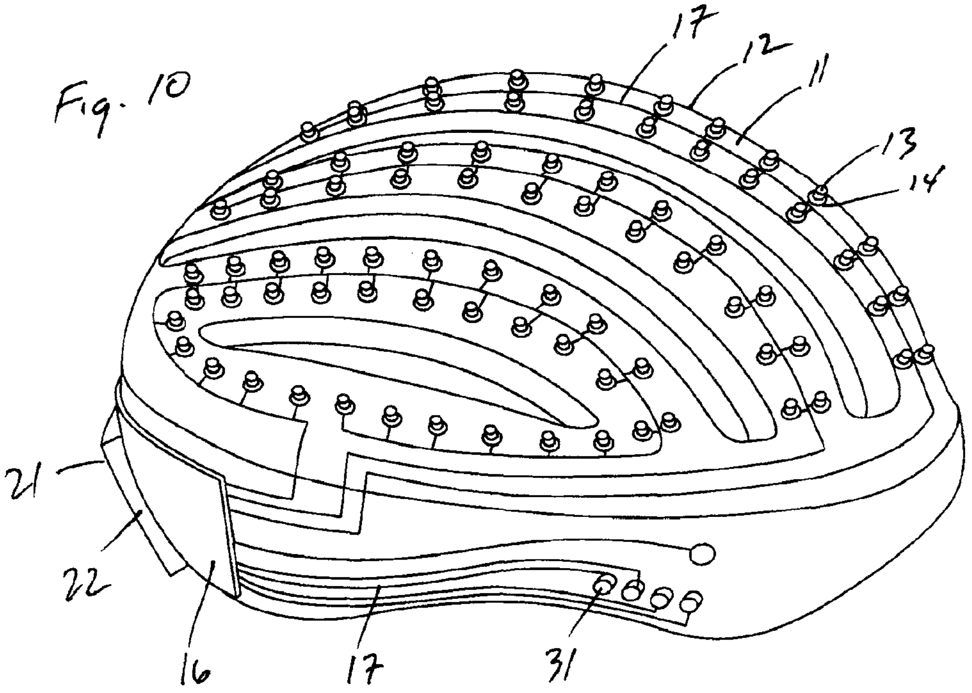
FIG. 10 is a perspective view of the helmet shown in FIG. 9 with the external layer removed to show the internal features.
Figure 11:
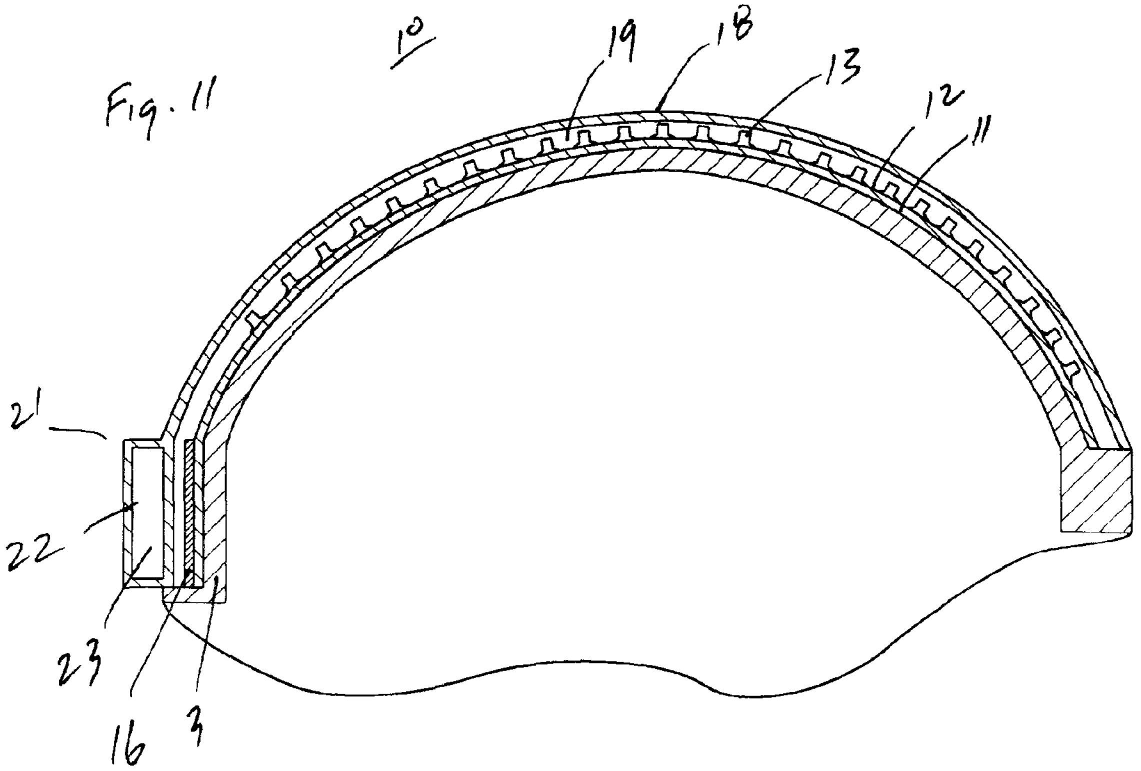
FIG. 11 is cross-section view of the helmet shown in FIG. 9.
Figure 12:
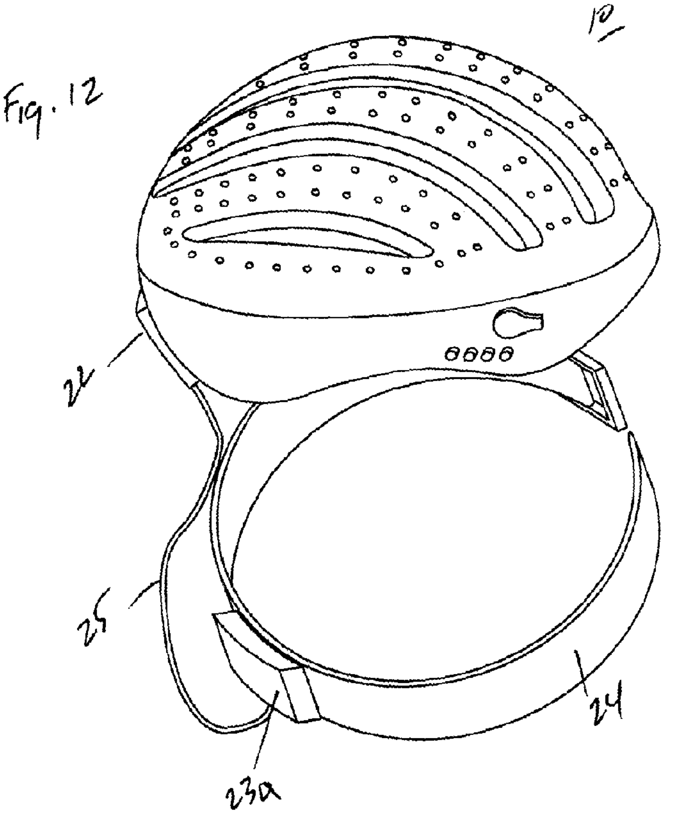
FIG. 12 is a perspective view of the helmet in FIG. 9 shown with a first embodiment of an indirect power supply.
Figure 13:
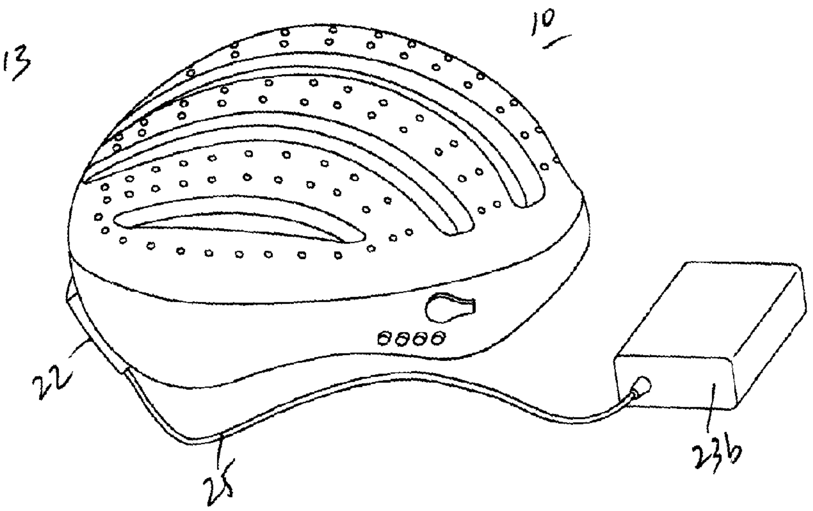
FIG. 13 is a perspective view of the helmet in FIG. 9 shown with a second embodiment of an indirect power supply.

Referring to FIGS. 1-3 and 4-6, and shown therein and generally designated by the reference character 10 is the first and second embodiment respectively of the helmet lighting system 10 constructed in accordance with the following description. For simplification of the following description, the various embodiments of the helmet lighting system herein can be generally described as falling into either an all-in-one design or a shell design or a pin and bore assembly. The first embodiment of the helmet lighting system 10 is an example of an all-in-one design and the second embodiment is an example of a shell design for attachment to an existing helmet. FIGS. 9-11 show an example of the first embodiment (all-in-one) incorporated in a bicycle helmet. The two embodiments are shown incorporated in a motorcycle helmet (FIGS. 1-6) and a bicycle helmet (FIGS. 9-11); however, it should be appreciated that the two embodiments of the helmet lighting system may be incorporated into a variety of helmets, including, but not limited to, a police helmet, a fireman helmet, a coast guard helmet, a military helmet, a snowboard or skiing helmet, a football helmet, a hockey helmet or any other helmet type device used worn on the head. Regardless of the nature of the helmet device 1, which are well known in the art, and shown for example purposes only, each is generally characterized by having an outer shell 2, inner padding 3, ventilation inlets 4, and retaining means such as a chin strap (not shown).

Figure 1:
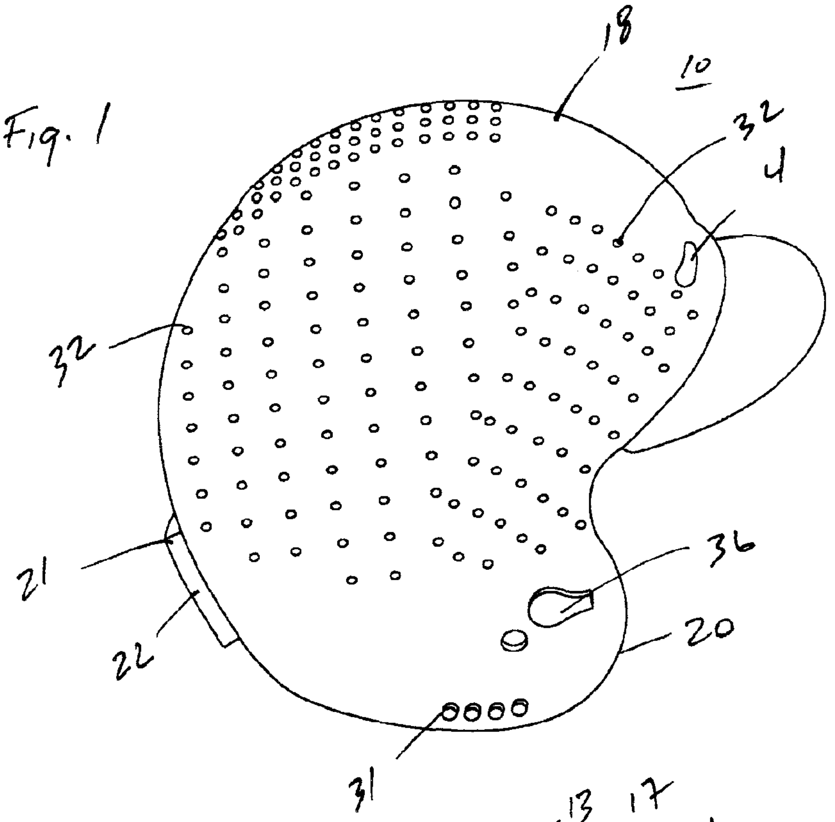
FIG. 1 is a perspective view of a first embodiment of the helmet lighting system disclosed herein incorporated into a helmet.
Figure 2:
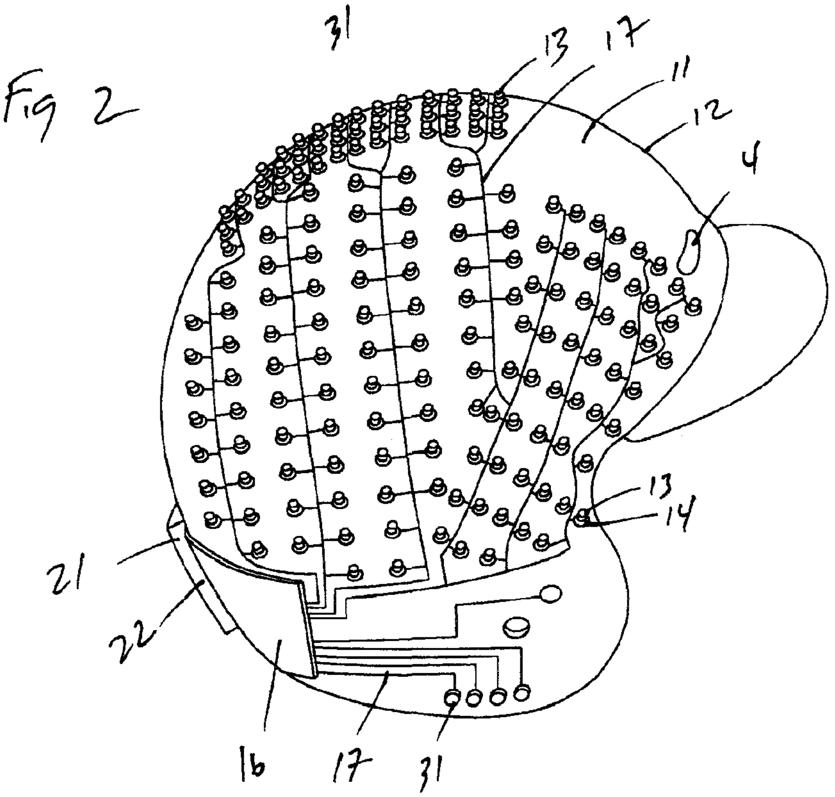
FIG. 2 is a perspective view of the helmet shown in FIG. 1 with the external layer removed to show the internal features.
Figure 3:
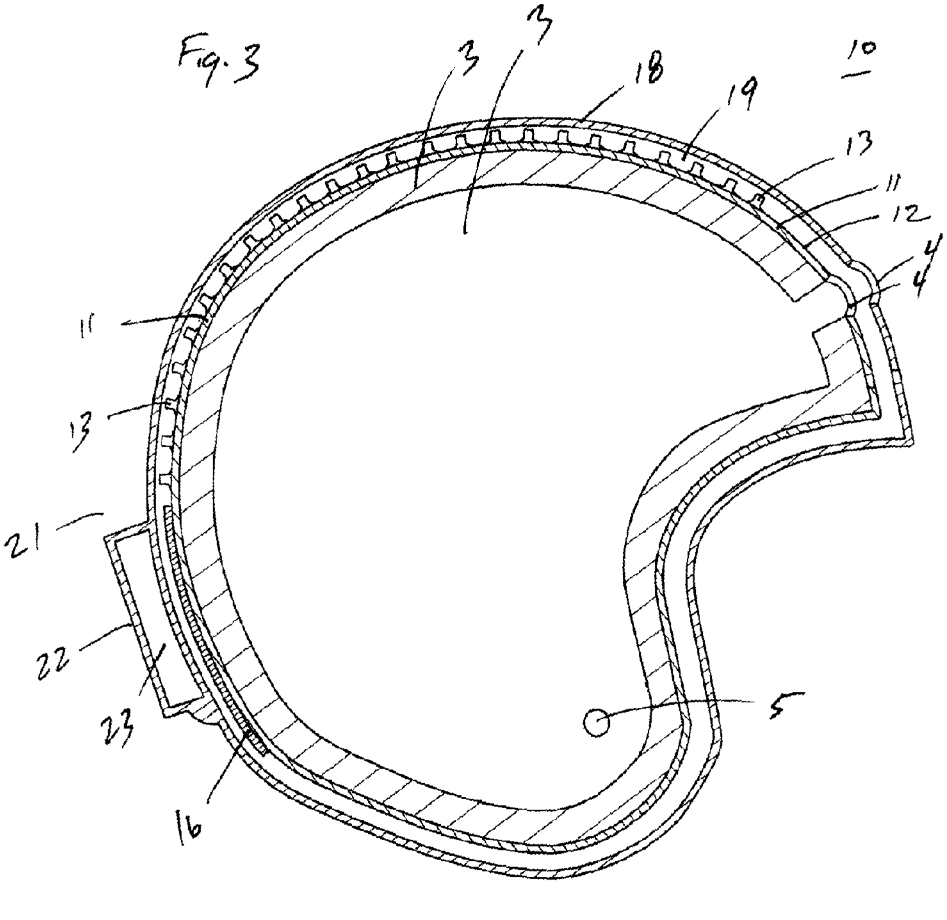
FIG. 3 is cross-section view of the helmet shown in FIG. 1.
Figure 4:
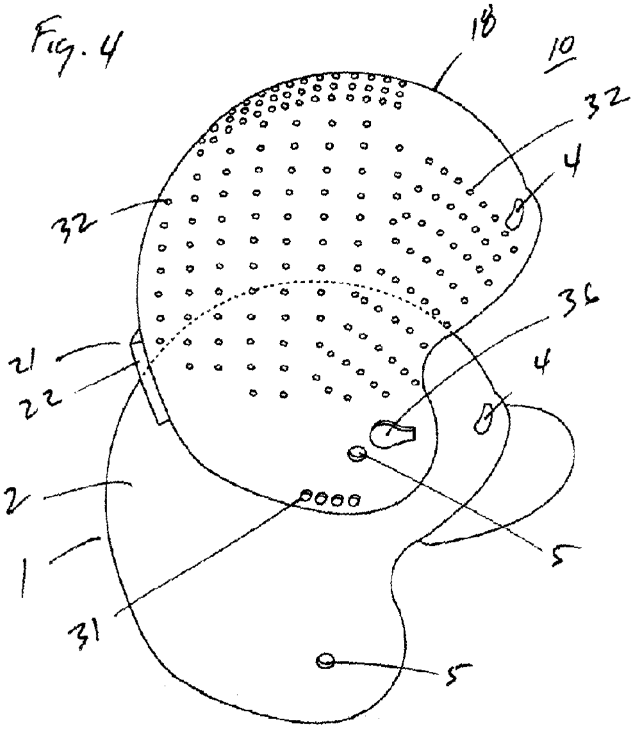
FIG. 4 is a perspective view of a second embodiment of the helmet lighting system disclosed herein incorporated into a shell for attachment to an existing helmet.
Figure 5:
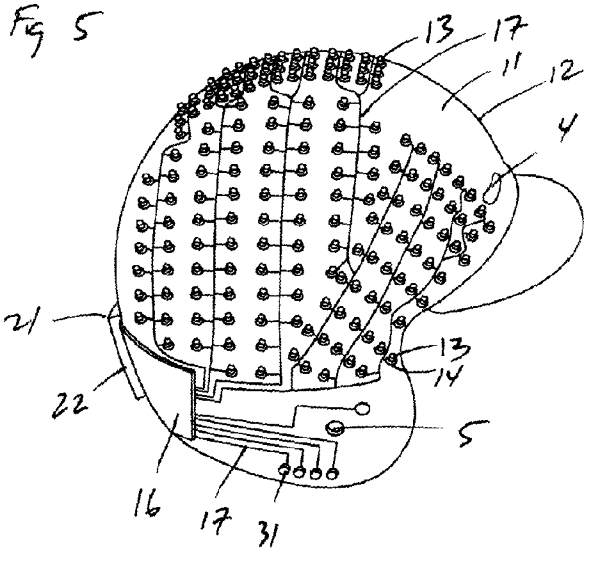
FIG. 5 is a perspective view of the helmet shown in FIG. 4 with the external layer removed to show the internal features.
Figure 6:
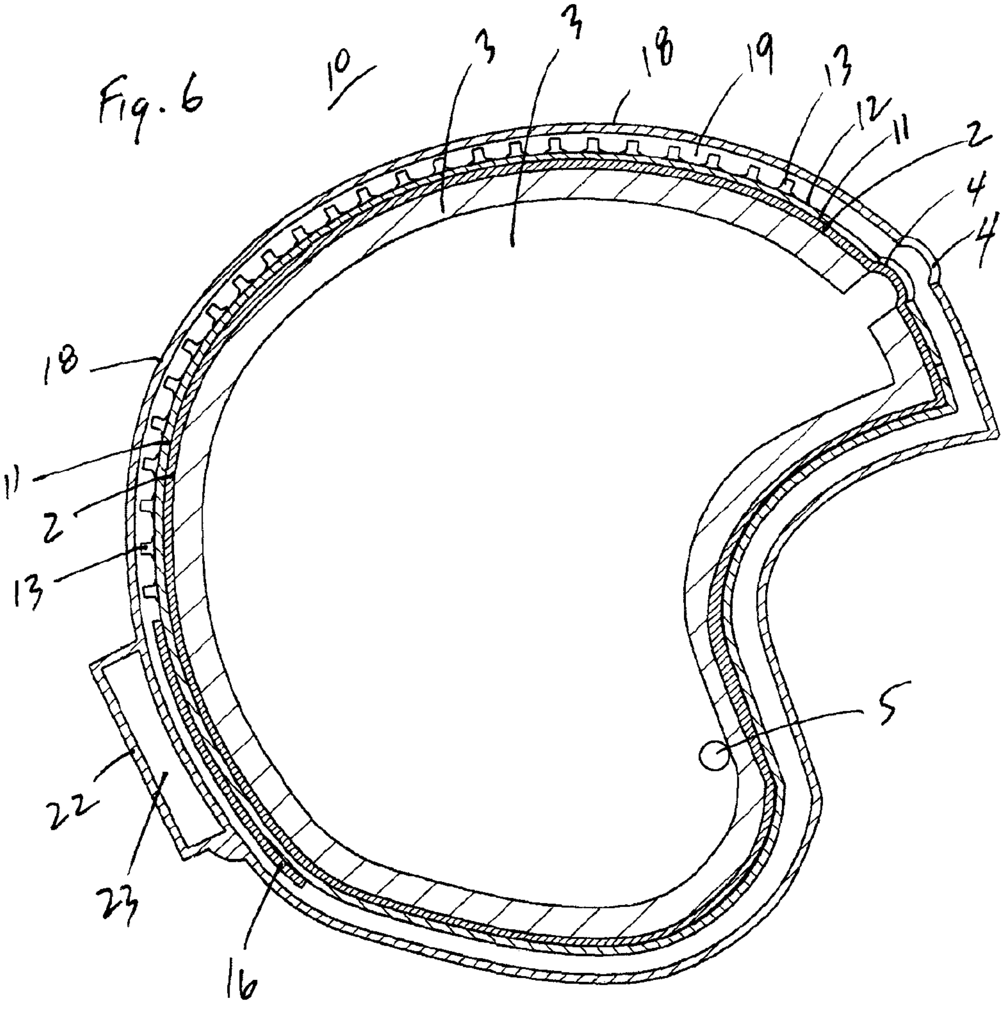
FIG. 6 is cross-section view of the helmet shown in FIG. 4.

Referring now to FIGS. 1-3, a first embodiment of the helmet lighting system 10 is shown wherein the system is integrated into a helmet (all-in-one). The lighting system includes a first layer 11 made of a moldable plastic type material, but may include carbon fiber or similar crash resistant material. Preferably, the first layer may be made of polycarbonate. The first layer includes an outer surface 12 to which a light emitting means is bonded to. Preferably the light emitting means is a light emitting diode (LED) 13 that is of high brightness such as the type manufactured by Nichia America Corporation. The LEDs include a base 14 that allows them to be individually bonded to the outer surface 12 of the first layer. Preferably the LEDs 13 are bonded using a urethane aerospace epoxy.

A controller means is mounted to the first layer as well using the above epoxy and is used to control the duration, intensity, and sequence of the LEDs 13. Preferably the controller means is an ultra low power circuit board 16 such as a 16.times.684 microcontroller chip which uses high efficiency, low on resistance field effect transistors to drive the LEDs 13. In such a configuration, the LEDs 13, even when left on continuously, generate little to no heat. Wiring means are then used for linking the LEDs 13 to the circuit board 16. Preferably low resistance wires 17 are used, which are well known in the art.

Figure 7:
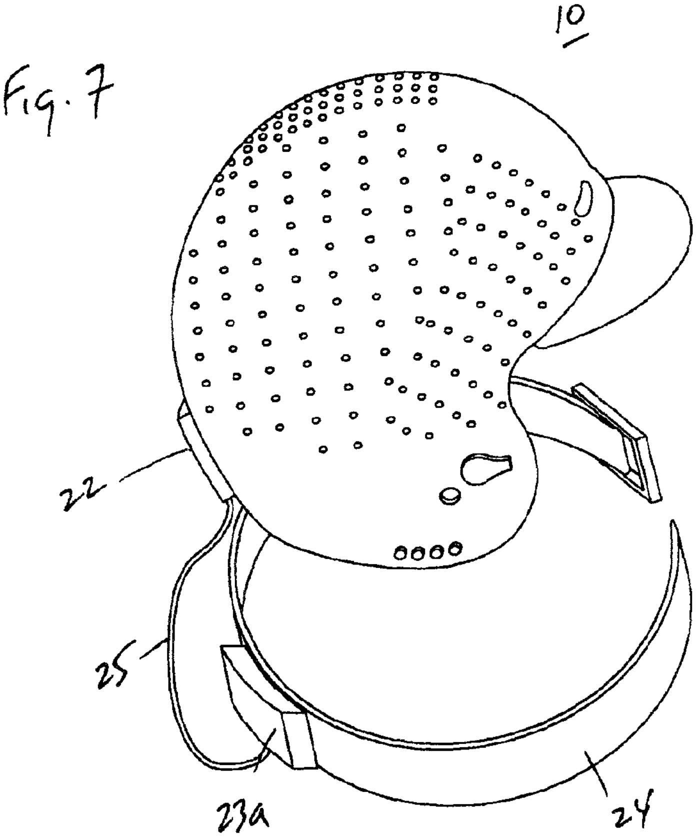
FIG. 7 is a perspective view of the helmets in FIGS. 1 and 4 shown with a first embodiment of an indirect power supply.
Figure 8:
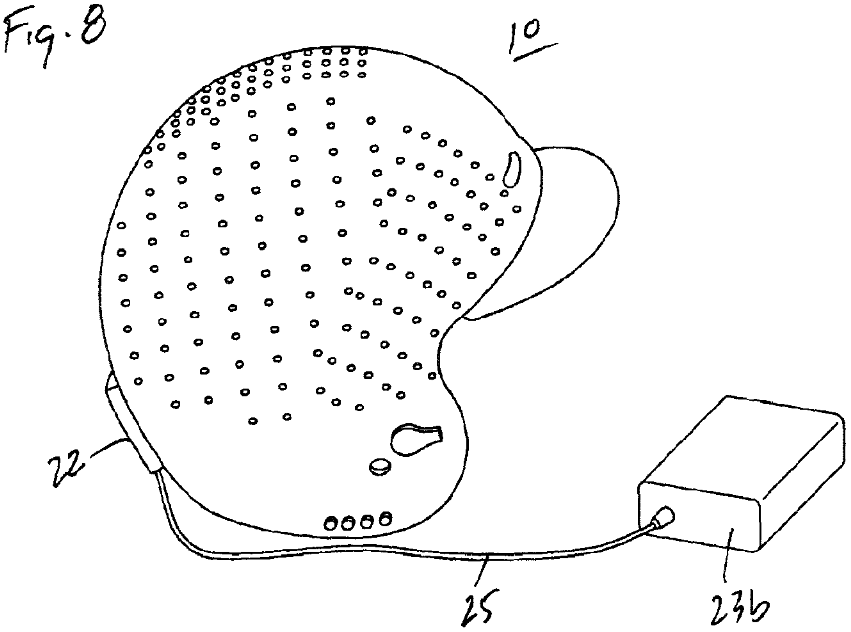
FIG. 8 is a perspective view of the helmets in FIGS. 1 and 4 shown with a second embodiment of an indirect power supply.
Figure 16:
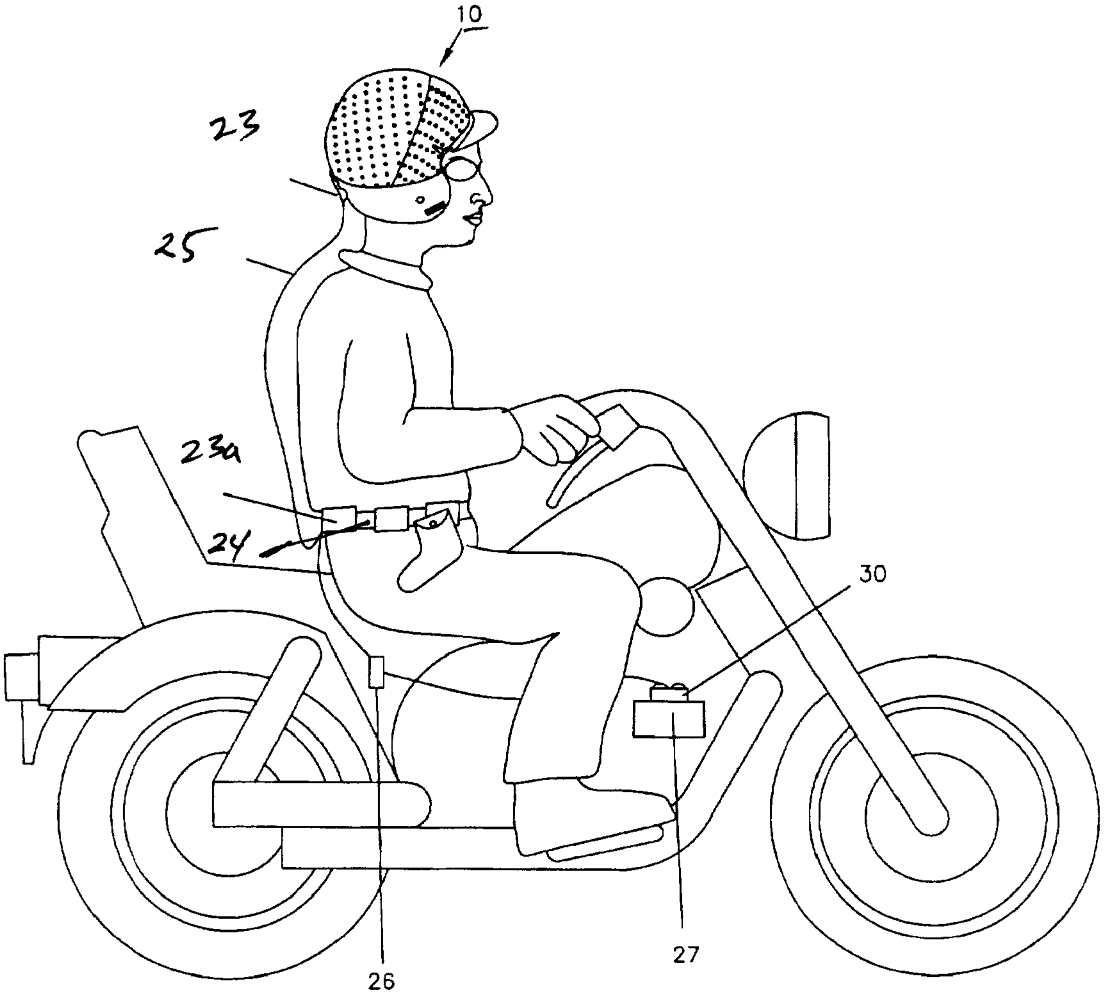
FIG. 16 is perspective view of the first and second embodiment of the helmet lighting system of FIGS. 1 and 4, shown on the head of a motorcyclist.

A second layer 18 is then fixably attached to the first layer 11 thereby providing an area 19 between the first layer 11 and the second layer 18. The second layer 18 is also made from a moldable crash resistant plastic material, but is preferably made of a transparent material such as polycarbonate so that the LEDs 13 are visible when activated by the circuit board 16. Preferably the second layer 18 is bonded to the first layer about its edges 20 using an epoxy or any other similar means so as to create a waterproof seal. A power source 21 is then fixedly attached to the second layer 18 for powering the circuit board 16 and the LEDs 13 again using a suitable epoxy that provides a waterproof seal. The powering means may be of two general types. The first type is a direct powering means such a battery compartment 22 which can house standard batteries, or preferably, a lightweight, high power 2.6 amp 14.8 volt Lithium-ion researchable battery pack 23. Alternatively, the helmet lighting system may employ a second type of powering means, an indirect powering means, as shown in FIGS. 7 and 8, whereby a battery pack 23 *a*, linked by an adapter 25 to the battery compartment 22, is mounted to a belt 24 (FIG. 7) or the battery pack 23 *b* is alone (FIG. 8) and linked to the battery compartment 22 by an adapter 25 and thereby capable of being mounted to the particular device the rider is utilizing. In these examples, the weight of the helmet is lessened by taking advantage of the indirect power source. Additionally, power for the helmet lighting system, in the case of a motorized vehicle, can be supplied by the motor vehicles existing battery or an additional dedicated battery mounted thereto. For example in FIG. 16, the lighting system 10 may also be charged though an adapter 25 which can be plugged into the utility belt 24 of the user. Once plugged in, the direct battery pack 23 can be charged or the lighting system 10 in the helmet can be run by the power from the utility belt 24 with the mounted battery pack 23 *a*. The direct mounted battery pack 23 may also be charged through a spring loaded extension 26 located under the seat of the motorcycle. This apparatus will be connected to an adapter 30 on the motorcycle's battery 27. The battery pack 23 from the helmet can then be connected to the spring loaded extension 26 through the utility belt 24 of the user. When the battery pack 23 is connected in this manner it can be charged through the motorcycle's battery 27 or other dedicated battery and have an unlimited source of power while connected to the motorcycle.

Operating means are then functionally linked to the circuit board 16 for its operation. Preferably the operating means include buttons 31 that can be mounted to the second layer 18. The buttons 31 can be programmed to elicit different flashing programs contained within the circuit board 16. Alternatively, the operating means may include wireless activation as is common in the art through the use of a remote control (not shown). Further, the operating means may be employed by linking the circuit board 16 to the device that is being ridden by use of a common adapter such that the signaling mechanisms of the device (stop, left turn, right turn, etc.) are directly transmitted to the circuit board 16 and the appropriate signal is displayed to the LEDs 13 contained in the helmet lighting system 10.

Figure 14:
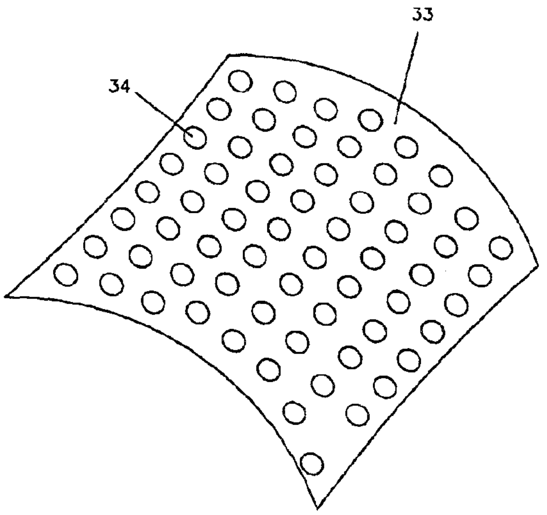
FIG. 14 is a perspective view of a perforated film cover.
Figure 15:
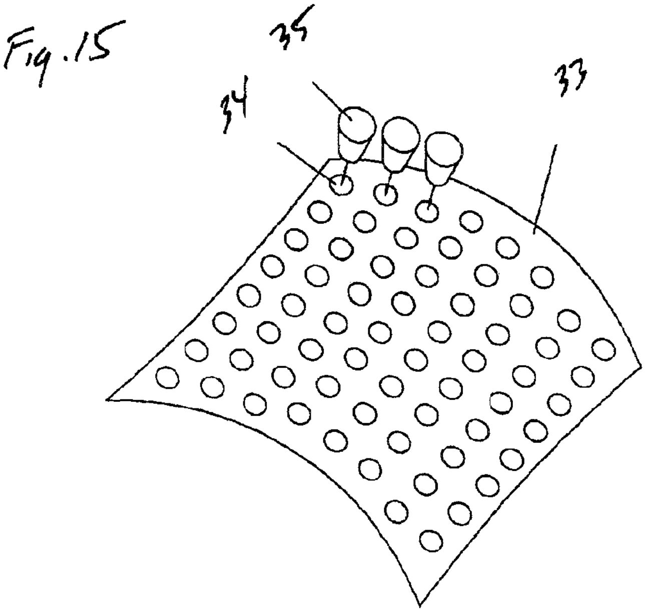
FIG. 15 is a perspective view of a second embodiment of the perforated film cover in FIG. 14.

Once the lighting system is fully assembled, the transparent second layer 18 can be painted. Areas 32 above the LEDs 13 are protected with a masking type device so that once the second layer is painted, the masking is removed and the LEDs 13 are able to shine through the unpainted transparent areas 32. Alternatively, the second layer 18 may be painted in advance with the proper window pattern for a given application and then simply assembled as described above. Likewise, a perforated film cover 33 can be placed over the second layer 18 with an adhesive such that window portions 34 are positioned over the location of the LEDs 13 mounted underneath. See FIG. 14. Given the LEDs 13 used, and the overall structure of the assembled lighting system 10 described above, the daylight visibility is at least 150 feet and night time visibility is at least one mile. If further visibility is desired, the windows portions 34 of the perforated film cover 33 may be filled with a magnifying plastic material 35 that will act to increase the LEDs' visibility. See FIG. 15.

The helmet lighting system 10 may also include at least one light emitting means mounted on the exterior surface of the second layer. Preferably this light emitting means is at least one LED housed within a pivoting retainer 36 so that the user can direct light in a variety of directions. It is preferred to have at least one pivoting LED retainer 36 on each side of the helmet and the range of motion of the retainer 36 is approximately 45 degrees. The pivoting light retainer 36 is functionally linked to the controller means, power means, and operating means as described above for the first layer 11 mounted LEDs 13.

In addition to the above features related to the helmet lighting system 10, the helmet may also feature a musical chip such as an mp3 player (not shown) that is capable of storing and playing music while the lighting system is functioning. The chips can play previously stored songs or additional songs that can be downloaded onto the chips. Music can be heard either through a speaker or a headphone jack. Such a musical chip is well known in the art. Further, the helmet lighting system 10 may include a motion sensor, such that when the helmet is left unattended and the sensor is activated, an alarm will sound if the helmet is moved in any way. The helmet may also include ventilation inlets 4 that allow air to flow to the user's head.

Referring now to FIGS. 9-13, the first embodiment of the helmet lighting system 10, as described fully above, is shown integrated into a lightweight helmet (all-in-one), such as for a bicycle rider. As seen in the figures, the overall structure is the same, and only the shapes of the items have changed to accommodate the lightweight helmet design. As also seen in the figures, all of the features listed above for the previous helmet design are present in the lightweight helmet shown here.

Referring now to FIGS. 4-8, a second embodiment of the helmet lighting system 10 is shown. The second embodiment is an example of a shell design for attachment to an existing helmet 1 that includes an outer shell 2, inner padding 3, ventilation inlets 4, and retaining means such as a chin strap (not shown). As seen in the associated figures, in this embodiment the shell is comprised of the same features as described above for the all-in-one design, with the only difference being that first layer 11 is mountable to the outer shell 2 of the existing helmet 1 by use of attachment means, thereby allowing existing helmets to be converted to a helmet with a light source. To aid in the attachment of the first layer 11 to the outer shell 2 of the existing helmet 1, it is preferred to vacuum form the desired plastic like material, such as polycarbonate to the outer shell 2 to ensure that a proper fit is obtained. Once the proper shape of the first layer 11 is obtained, the lighting system 10 is built up the same way as described above, thereby resulting in a shell that can be now attached to an existing helmet 1 and secured with the appropriate attachment means. Potential attachment means include, sonic welding, adhesive, screws and any other means of binding two like material together. Preferably the shell is attached by utilizing the existing helmets hardware such as rivets that are used to secure the chin strap to the helmet 1. The rivets are removed from the bores 5 located on each side of the helmet 1, the shell is placed on the outer shell 2, and the rivets are reinserted into the bores 5 to secure the shell upon the helmet 1. Further, the shell is preferably formed such that it incorporates the same ventilation inlets 4 as found in the existing helmet so to not impede air flow to the user.

A third embodiment of the invention is a flexible helmet lighting system composed of latex or other similar material fitting over an existing helmet 1 that includes an outer shell 2, inner padding 3, ventilation inlets 4, and retaining means such as a chin strap (not shown). In this embodiment the flexible helmet lighting system is comprised of the same features as described above for the shell design, with the only difference being that first layer 11 is mountable to the outer shell 2 of the existing helmet 1 by use of fitting means, thereby allowing existing helmets to be converted to a helmet with a light source. To aid in the fitting of the first layer 11 to the outer shell 2 of the existing helmet 1, it is preferred to compose the system of flexible material, such as latex or rubber to ensure that a proper fit is obtained and to also allow the flexible helmet lighting system to be inflatable and float. A strap or cord which can be pulled is included to tighten around the base to also ensure that a proper fit is obtained. Once the proper shape of the first layer 11 is obtained, the lighting system 10 is built up the same way as described above, thereby resulting in a flexible system that can be now fitted onto an existing helmet 1 and secured with the appropriate attachment means. Potential attachment means include another strap or cord and a Velcro attachment.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements. For example, it is contemplated that the light emitting means may further include a light bar, light strip or any other light emitting means. It is further contemplated that, regardless of the light emitting means used, they can be arranged in an infinite amount of ways, utilize an infinite amount of colors, and fire in an infinite amount of patterns and would still fall within the scope of the broadest interpretation of this disclosure.

What is claimed is:

1. A helmet having a lighting system, comprising:

a first layer constructed of a crash resistant material;

a plurality of light emitting devices, wherein the plurality of light emitting devices are located on each of a forward portion and a rearward portion of the helmet;

a second layer that covers at least a portion of the plurality of light emitting devices, wherein at least a portion of the second layer permits light emitted from the plurality of light emitting devices to be visible through the second layer;

a circuit board configured to operate the plurality of light emitting devices;

a power source configured to provide power to the plurality of light emitting devices;

wherein the circuit board is configured to operate a first portion of the plurality of light emitting devices to display a right turn signal or a second portion of the plurality of light emitting devices to display a left turn signal in response to a turn signal instruction received by the circuit board, wherein the circuit board is configured to operate a third portion of the plurality of light emitting devices that are not included in the first portion and the second portion, and wherein the third portion is located on forward portion of the helmet.

2. The helmet of claim 1, wherein one or both of the power source and the circuit board are located on a lower rear portion of the helmet.

3. The helmet of claim 1, further comprising a signaling mechanism associated with a vehicle ridden by the user of the helmet, wherein the signaling mechanism is configured to issue the turn signal instruction to the circuit board.

4. The helmet of claim 3, wherein the signaling mechanism is a remote control.

5. The helmet of claim 1, wherein the power source and the circuit board overlap with one another relative to an outer surface of the helmet.

6. The helmet of claim 5, wherein the power source and the circuit board are located on a lower rear portion of the helmet.

7. The helmet of claim 6, further comprising a compartment that houses the power source.

8. The helmet of claim 1, wherein the first layer and the second layer define a plurality of ventilation openings.

9. The helmet of claim 1, further comprising a motion sensor.

10. A helmet having a lighting system, comprising:

a first layer constructed of a crash resistant material;

a plurality of light emitting devices;

a second layer that covers at least a portion of the plurality of light emitting devices, wherein at least a portion of the second layer permits light emitted from the plurality of light emitting devices to be visible through the second layer;

a circuit board configured to operate the light emitting devices;

a power source configured to provide power to the light emitting devices;

wherein the helmet comprises an upper portion comprising an upper shell, wherein the helmet further comprises a lower portion located below the upper shell;

a compartment located on a rearward-facing portion of the lower portion of the helmet, wherein the power source is received within the compartment.

11. The helmet of claim 10, wherein the power source and the circuit board overlap with one another relative to an outer surface of the helmet.

12. The helmet of claim 11, wherein the circuit board is configured to operate the light emitting devices to display a stop signal.

13. The helmet of claim 10, wherein the upper portion defines a plurality of ventilation openings.

14. The helmet of claim 10, wherein the circuit board is configured to operate the light emitting devices to display a stop signal.

15. The helmet of claim 10, further comprising a motion sensor.

16. A helmet having a lighting system, comprising:

an inner layer constructed of a crash resistant material and comprising an upper portion, a lower portion, and a rearward-facing portion in the lower portion;

a plurality of light emitting devices;

an outer layer that covers at least a portion of the plurality of light emitting devices, wherein at least a portion of the outer layer permits light emitted from the plurality of light emitting devices to be visible through the outer layer;

a circuit board configured to operate the light emitting devices;

a power source configured to provide power to the light emitting devices;

a compartment that houses the power source, the compartment located in the rearward-facing portion of the lower portion of the inner layer.

17. The helmet of claim 16, wherein the inner layer comprises a recessed portion located in the rearward-facing portion of the lower portion of the inner layer, and wherein the circuit board is located in the recessed portion.

18. The helmet of claim 16, wherein the outer layer assembly comprises an upper shell, wherein the lower portion is located below the upper shell.

19. The helmet of claim 18, wherein the outer layer assembly further comprises a lower shell, wherein the lower shell covers at least a portion of the lower portion of the first inner layer.

20. The helmet of claim 16, wherein the circuit board is configured to operate a portion of the plurality of light emitting devices to display a left turn light display and a right turn light display in response to receiving a left turn signal and a right turn signal, respectively.

* * * * *